United States Patent
Min et al.

(10) Patent No.: US 12,400,428 B2
(45) Date of Patent: Aug. 26, 2025

(54) AUTOMATIC CLASSIFICATION METHOD AND SYSTEM OF TEACHING VIDEOS BASED ON DIFFERENT PRESENTATION FORMS

(71) Applicant: Central China Normal University, Wuhan (CN)

(72) Inventors: Qiusha Min, Wuhan (CN); Ziyi Li, Wuhan (CN)

(73) Assignee: Central China Normal University, Wuhan (CN)

( * ) Notice: Subject to any disclaimer, the term of this patent is extended or adjusted under 35 U.S.C. 154(b) by 494 days.

(21) Appl. No.: 18/149,035

(22) Filed: Dec. 30, 2022

(65) Prior Publication Data
US 2023/0290118 A1   Sep. 14, 2023

(30) Foreign Application Priority Data
Mar. 14, 2022  (CN) .......................... 202210249839.3

(51) Int. Cl.
*G06V 10/764*   (2022.01)
*G06V 10/44*   (2022.01)
(Continued)

(52) U.S. Cl.
CPC ............ *G06V 10/764* (2022.01); *G06V 10/44* (2022.01); *G06V 10/82* (2022.01); *G06V 20/46* (2022.01); *G06V 40/161* (2022.01)

(58) Field of Classification Search
CPC ...... G06V 10/764; G06V 20/46; G06V 10/82; G06V 40/161; G06V 10/44
See application file for complete search history.

(56) References Cited

U.S. PATENT DOCUMENTS

2023/0290118 A1* 9/2023 Min ..................... G06V 40/161
2025/0181985 A1* 6/2025 Chatterjee ............. H04W 64/00

FOREIGN PATENT DOCUMENTS

| CN | 106851419 A | 6/2017 |
| CN | 111666748 A | 9/2020 |
| CN | 112861802 A | 5/2021 |

OTHER PUBLICATIONS

Wang, Biao, and Xiao Guo. "Analysis of Classroom Teaching Status Based on Target Detection Model." 2019 IEEE 10th International Conference on Software Engineering and Service Science (ICSESS). IEEE, 2019. (Year: 2019).*

(Continued)

*Primary Examiner* — Utpal D Shah
(74) *Attorney, Agent, or Firm* — Nitin Kaushik

(57) ABSTRACT

The present disclosure belongs to the technical field of artificial intelligence, and discloses an automatic classification method and system of teaching videos based on different presentation forms, which with three convolutional neural network models, may accurately locate the information required for teaching video classification by two self-trained YOLOV4 target detection neural network models and human body key point detection technology, solves the problem that the background and character features of teaching videos do not change significantly, and improves the accuracy of feature extraction. The structure of the self-built convolutional neural network models is suitable for classification of Interview type and Head type teaching videos. The depth of the network is just appropriate compared with several classical video classification algorithms, which reduces the energy consumption of computer hardware. Using other related image data sets preprocessed as the required training sets breaks through the bottleneck in data sets of teaching video.

10 Claims, 12 Drawing Sheets

(51) Int. Cl.
*G06V 10/82* (2022.01)
*G06V 20/40* (2022.01)
*G06V 40/16* (2022.01)

(56) References Cited

OTHER PUBLICATIONS

Köse, Erman, Elif Talbeyaz, and Selçuk Karaman. "Classification of instructional videos." Technology, Knowledge and Learning 26.4 (2021): 1079-1109. (Year: 2021).*
Choe, Ronny C., et al. "Student satisfaction and learning outcomes in asynchronous online lecture videos." CBE—Life Sciences Education 18.4 (2019): ar55. (Year: 2019).*

* cited by examiner

AUTOMATIC CLASSIFICATION METHOD AND SYSTEM OF TEACHING VIDEOS BASED ON DIFFERENT PRESENTATION FORMS

CROSS-REFERENCE TO RELATED APPLICATIONS

The application claims priority to Chinese patent application No. 202210249839.3, filed on Mar. 14, 2022, the entire contents of which are incorporated herein by reference.

TECHNICAL FIELD

The present disclosure belongs to the technical field of artificial intelligence, and in particular relates to an automatic classification method and system of teaching videos based on different presentation forms.

BACKGROUND

At present, with rapid development of education informatization, online teaching video plays a particularly important role in actual teaching. Also, more and more scholars have devoted themselves to analysis of teaching videos, accompanied by production of different styles of teaching videos. Previous studies show that teaching videos in different presentation forms not only affect learners' learning motivation and participation, but also affect learners' performance. Learners show different acceptance of teaching videos in different presentation forms. In psychology, different information presentation forms of teaching videos also have a significant impact on learners' cognitive load and sense of social presence. The presentation form of teaching videos is as important as the content to be expressed. According to the inventor's analysis of teaching videos in different presentation forms, teaching videos are mainly presented in six different forms as follows: pure PPT type, PPT+ teacher image type, studio recording type, classroom recording type, Interview type and Head type. Automatic classification of teaching videos in different presentation forms may not only help learners to quickly find their preferred videos and improve learning efficiency, but also help the teaching video producers to make targeted videos.

At present, classical neural network models used for video classification in the field of computer vision include VGG, GoogLeNet, Residual Network, etc. These models are mainly composed of a convolution layer, a pooling layer and a fully connected layer. The function of a convolution layer is to extract the features of an image. A pooling layer is configured to compress a feature map and has a dimension reduction effect. A fully connected layer generally appears at last in a convolution neural network, so that the convolution neural network finally outputs one-dimensional feature vectors. A convolution layer performs convolution by a convolution kernel, and the nonlinearity of outputs of the convolution layer is increased by an activation function. A pooling layer is generally connected behind the convolution layer to speed up operations and make some detected features more stable. VGG19 includes 16 convolution layers and 3 fully connected layers. GoogLeNet includes 22 layers and uses an Inception structure, that is, each node is a small network. Residual Network introduces residual blocks. Taking 34-layer as an example, it indicates that there are 34 layers for training parameters, and a pooling layer does not include trainable parameters.

These models have the same characteristics that the network models are deep, and there are high requirements for computer hardware. If satisfactory results are desired, a large number of data sets are required for training. At present, there is no public data set of teaching videos, and it is difficult to collect a large number of data sets of teaching videos. Thus, it is difficult to obtain ideal experimental results directly using these classification models. Analysis shows that many existing classification neural network models performs classification according to changes of scenes or dramatic changes of a character's action, which is also not applicable to teaching videos in different presentation forms. The mode of shooting teaching videos usually does not change much. Generally, the characters appearing in teaching videos refer to teachers. In one teaching video, the teacher's teaching behavior does not change significantly. If teaching videos in different presentation forms are classified directly by the prior art, the results are unsatisfactory.

Through the above analysis, the prior art has the following problems and defects:

(1) At present, different styles of teaching videos appear like a blowout on various teaching platforms. It is a time-consuming process to manually classify teaching videos based on different presentation forms.

(2) The existing teaching video classification methods have high requirements for computer hardware, and require a large number of data sets for training. Therefore, according to the actual situation, the experimental results obtained by directly using the existing methods are unsatisfactory.

(3) According to the characteristics of teaching videos, the existing video classification network models are not applicable to teaching videos in different presentation forms.

The difficulties to solve the above problems and defects are: there are many data sets for analyzing video classification, but there are few data sets of different presentation forms of teaching videos, which leads to difficulties in the training process of teaching videos.

There are many analyses on automatic video classification, but obviously different from other scene classification videos, teaching videos have single scenes, no obvious changes in characters' actions, and no obvious changes in shots. Therefore, it is difficult to directly classify teaching videos successfully by the prior art.

The significance of solving the above problems and defects is:

The method provided by the present disclosure is proved by experiments to be a reasonable application of target detection technology and deep learning in the field of video classification. The method can automatically classify teaching videos based on different presentation forms, so as to reduce the workload of manual classification of teaching videos and improve the classification effectiveness of teaching videos.

A new convolutional neural network model is provided for the field of video and image classification. The model has an appropriate depth, requires an appropriate number of data sets for training, may save computer performance and may achieve a favorable effect.

After teaching videos are automatically classified effectively by the method of the present disclosure, new inspiration and ideas may be provided for analysts in the field of teaching video analysis (such as teaching video quality evaluation and personalized recommendation of teaching videos), psychological analysis (such as the impact of different presentation forms of teaching videos on learners' cognitions), and other related fields.

SUMMARY

In view of the problems in the prior art, the present disclosure provides an automatic classification method and system of teaching videos based on different presentation forms.

The present disclosure is implemented as follows: First, at present, there are many standards for classification of teaching videos based on different presentation forms, but there is no analysis on automatic classification methods of teaching videos based on different presentation forms. The method provided by the present disclosure solves this problem and provides great help for subsequent analysis of teaching videos based on different presentation forms. Second, the method does not directly classify the six types of teaching videos, but divides the six types of teaching videos in two or separately according to the characteristics of the teaching video images: the classroom recording type and the pure PPT type are classified separately, the PPT plus teacher image type and the studio recording type are classified in one type, and the interview type and the head type are classified in one type, which greatly improves the accuracy of teaching video classification. Third, the method provides data sets of classroom scenes with manually marked features to a self-training YOLOV4 target detection network model 1, and by using other similar image data sets for training, the method solves the problem of insufficient data sets in the field of teaching video analysis based on different presentation forms. Finally, the method provides a convolutional neural network model, which not only improves the accuracy of teaching video classification, but also reduces energy consumption of computer hardware.

Specifically, the present disclosure provides an automatic classification method of teaching videos based on different presentation forms, comprising:

Step 1, extracting classroom features from key frames of a video using a self-trained YOLOV4 target detection network model 1, and determining whether the video is a classroom recording type by the outputted classroom features;

Step 2, determining whether the video is a pure PPT type by the information outputted from a self-trained YOLOV4 target detection network model 2;

Step 3, distinguishing PPT plus teacher image type videos from studio recording type videos according to human body key point detection; and Step 4, distinguishing the features of interview type videos from those of head type videos using a self-built convolutional neural network model.

Further, the automatic classification method of teaching videos based on different presentation forms, specifically comprising:

(1) collecting six types of teaching videos, classifying the collected video sets according to six types of teaching videos, and extracting video key frames;

(2) after extracting the video key frames, preprocessing the video key frames to form video folders, each folder being composed of corresponding video key frames as a test set for teaching video detection;

(3) detecting the preprocessed key frames in the folders of videos by two self-trained YOLOV4 target detection network models, and determining whether the video types are pure PPT type, PPT plus teacher image type, classroom recording type and studio recording type through the outputted information;

(4) cutting the face parts of key frames in the interview type and head type videos in a size of 28×28 through face detection technology;

(5) since the interview type and the head type teaching videos have some differences in head pose features, collecting and classifying public data sets of face images and head poses; and (6) inputting the key frames in the remaining folder into the self-built convolutional neural network model for classification detection.

Further, the six types of teaching videos in step (1) comprise pure PPT type, PPT plus teacher image type, classroom recording type, studio recording type, interview type and head type.

Further, the preprocessing the video key frames in step (2) comprises unifying the picture size to 416×416 and removing average values from the images.

Further, in step (5), the collected public data sets are used as training sets, validation sets and test sets for training and distinguishing the two video types, three types of data are input into the self-built convolutional neural network respectively, and after the optimal weight is obtained, the video folders formed by the key frames extracted from the two types of videos are used as the final test sets for final detection.

Another objective of the present disclosure is to provide an automatic classification system of teaching videos based on different presentation forms, the system being implemented by using deep learning technology, and comprising three neural network model units:

a self-trained YOLOV4 target detection network model 1 unit: a large number of collected images with classroom features are used as data sets, classroom features on each image are marked, and a YOLOV4 target detection network model is trained and optimized using the marked tags, so that the YOLOV4 target detection network model 1 detects classroom features in images or videos;

a self-trained YOLOV4 target detection network model 2 unit: a YOLOV4 target detection network model is trained using a public COCO data set, so that the YOLOV4 target detection network model 2 outputs character information in images or videos; and a self-built convolutional neural network model unit: Prelu is used as an activation function, an Adabound optimizer is used, a data enhancement layer is added to the first layer, each layer uses BatchNormalization for batch normalization, and the last layer uses a softmax function for classifying key frames of teaching videos.

Further, the self-built convolutional neural network model unit comprises 5 convolution layers, 1 pooling layer, 1 Dropout layer and 2 fully connected layers connected in turn, 3 convolution layers having a convolution core size of 3×3 and a step size of 1, 2 convolution layers having a convolution core size of 3×3 and a step size of 2, and the convolution layers with the step size of 1 and the convolution layers with the step size of 2 being arranged alternately; and the pooling layer having a size of 2×2 and a step size of 2, and being connected behind the last convolution layer; the first fully connected layer having a size of 256; the parameter of the Dropout layer being 0.3; the size of the second fully connected layer being the size of the classified video type; and the size of an input layer being 28×28×3.

The self-built convolutional neural network model is different from other convolutional neural network models in the following:

(1) Before an image is used, the face part of the image is detected and clipped, which not only makes the image unified and easy to operate, but also reduces the impact of irrelevant information such as background on feature extraction of the self-built convolutional neural network model.

(2) Since a face image is complex relative to ordinary images, and small convolution kernels may better extract image details and more effective features, convolution kernels used by a convolution layer are all 3×3 small convolution kernels.

(3) Since it is found that the convolution layer with a step size of 2 may replace the pooling layers to obtain a favorable feature extraction effect, the first two pooling layers in a 3-layer convolutional neural network are replaced by a convolution layer with a step size of 2. Since a pooling layer has a dimension reduction effect, the pooling layer at the third layer is not replaced. After four layers of convolution, the convolution layer at the fifth layer collects all image features. If the sixth layer is a convolution layer and directly connected with a fully connected layer, a large number of features will disappear directly. Therefore, the sixth layer is a pooling layer for compressing the convolution features of the first five layers, and then the sixth layer is connected with a fully connected layer to retain more effective features while reducing feature loss, thereby improving the accuracy of teaching video classification.

In combination with all the above technical solutions, the present disclosure has the following advantages and positive effects:

The teaching video classification technology based on different presentation forms provided by the present disclosure comprises three convolutional neural network models, may accurately locate the information required for teaching video classification by two self-trained YOLOV4 target detection neural network models and human body key point detection technology, solves the problem that the background and character features of teaching videos do not change significantly, and improves the accuracy of feature extraction. The structure of the self-built convolutional neural network models is suitable for classification of Interview type and Head type teaching videos. The depth of the network is just appropriate compared with several classical video classification algorithms, which reduces the energy consumption of computer hardware. Using other related image data sets preprocessed as the required training sets breaks through the bottleneck in data sets of teaching video.

Compared with the classical video classification model, the present disclosure achieves better results. First, the classical video classification model is not well adapted to classification of teaching videos, because not all of the six types of teaching videos have obvious change features, and the data sets of teaching videos are insufficient. The method provided by the present disclosure is efficient and has high prediction accuracy. Second, the depth of the self-built convolutional neural network models in the method is appropriate, so the time required for model training is also less than that required by several classical video classification models, computer performance consumption is reduced and time is saved. Third, automatic classification of teaching videos by the method saves time and energy required by manual classification, and improves the efficiency of teaching video classification. Finally, the teaching video classification method provided by the present disclosure may be applied to situations that other classical video classification methods cannot solve, and provide methods and ideas for other video classification methods. Also, the automatic classification technology of teaching videos based on different presentation forms may help analyze various problems such as the impact of teaching video presentation forms on students' acceptance in education, and help to analyze the effect of the presentation forms of teaching videos on students' psychology (cognitive load, sense of social presence, etc.) in psychology. In other analysis, the method provided by the present disclosure may also provide new ideas and methods for analyzing the quality of teaching videos and other related problems.

The present disclosure combines the target detection technology in computer vision with the video classification technology to achieve favorable classification effect of teaching videos based on different presentation forms, which is a new method in the field of video classification. Moreover, a self-built convolutional neural network model is provided for efficiently classifying teaching videos. The present disclosure also provides a new convolutional neural network model for video or picture classification, which is convenient for use by other analysts, reduces the algorithm redundancy, saves the computer operation performance, and improves the classification accuracy.

In view of rapid development of online teaching technology, online teaching breaks through the traditional teaching bottleneck, is not limited by time and space, and is more and more accepted by the public, followed by a blowout of teaching videos. However, a wide variety of teaching videos also cause resource waste and many other problems. The classification method of teaching videos in different presentation forms may effectively help learners to find the appropriate type of teaching videos, reduce the time for manually searching for teaching videos, also improve learners' learning rate, reduce resource waste, and have a certain impact and significance on improving the efficiency of teaching and learning.

DETAILED DESCRIPTION OF THE EMBODIMENTS

Figure 1:
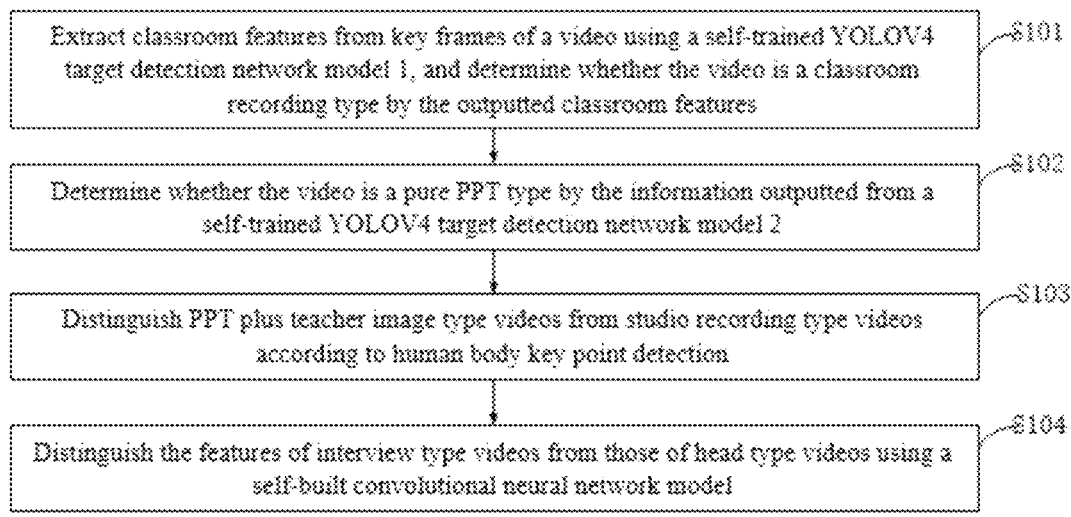
FIG. 1 shows a flow chart of the automatic classification method of teaching videos based on different presentation forms provided by the example of the present disclosure.

In view of the problems in the prior art, the present disclosure provides an automatic classification method and system of teaching videos based on different presentation forms. The present disclosure is described in detail below with reference to the drawings.

1. In order to enable those skilled in the art to fully understand how the present disclosure is specifically implemented, this part is an explanatory example of the technical solution of the claims.

Through early analysis of the characteristics of teaching videos, it is found that different from videos in other classification data sets, there are six main presentation forms of teaching videos, which have non-distinct underlying features, and are difficult to classify using the classical video classification models. It is found that the features extracted from teaching videos are not closely related to the time dimension, and the presentation form of a teaching video may be distinguished by one or several frames in the teaching videos, so the target detection technology is found the potential and effectiveness in the field of video classification. A rational conjecture is proposed to use a target detection neural network model and a self-built convolutional neural network model to classify teaching videos based on different presentation forms. Through the collected data sets and use of a deep learning method, the optimal weight of the self-built convolutional neural network model is obtained. Finally, by detecting the above models using a self-built teaching video test set, the rationality and effectiveness of the conjecture are verified, and the target detection neural network model and the self-built convolutional neural network are applied in the field of teaching video classification.

The present disclosure first extracts key frames from existing teaching videos as video level features. All video key frames in each folder represent a video level feature. The video type is determined according to the folder detection results. After the key frames of the teaching videos are extracted, the key frames are preprocessed to make the size of each key frame uniform and remove mean values. All of the key frames are used as the final test set. In order to ensure the authenticity and robustness of the model effect, the present disclosure uses pictures from other public data sets to train and verify the model. First, the blackboard, whiteboard and other features in a classroom scene of a public data set LSUN are manually marked, and then a YOLOV4 target detection network model 1 is trained using manual tags. A YOLOV4 target detection network model 2 is trained using a public data set COCO, and finally the location and other information of a character is outputted. The images in public datasets 300W-LP, CACD2000, etc. are classified and preprocessed, and the face parts are cut out and inputted into a self-built convolutional neural network model for training. The 6 types of teaching videos are classified with the information outputted from the above three models.

As shown in FIG. 1, the automatic classification method of teaching videos based on different presentation forms provided by the example of the present disclosure includes:

S101: Classroom features in key frames of a video are extracted using a self-trained YOLOV4 target detection network model 1, and whether the video is a classroom recording type is determined by the outputted classroom features.

S102: Whether the video is a pure PPT type is determined by the information outputted from a self-trained YOLOV4 target detection network model 2.

S103: PPT plus teacher image type videos are distinguished from studio recording type videos according to human body key point detection.

S104: The features of interview type videos are distinguished from those of head type videos using a self-built convolutional neural network model.

The present disclosure is further described in combination with the example.

Example

Figure 2:
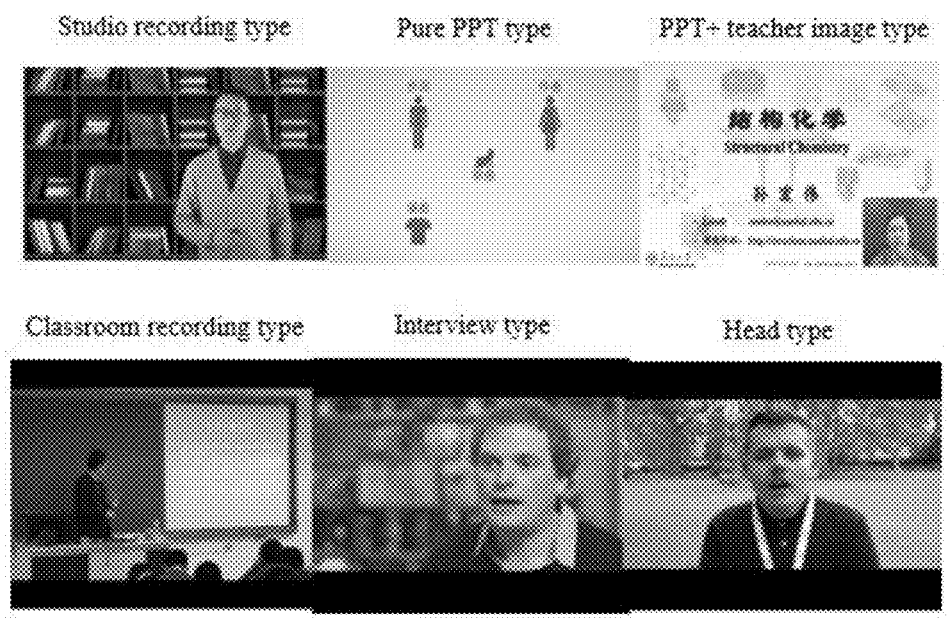
FIG. 2 shows examples of six teaching video presentation forms provided by the example of the present disclosure.
Figure 3:
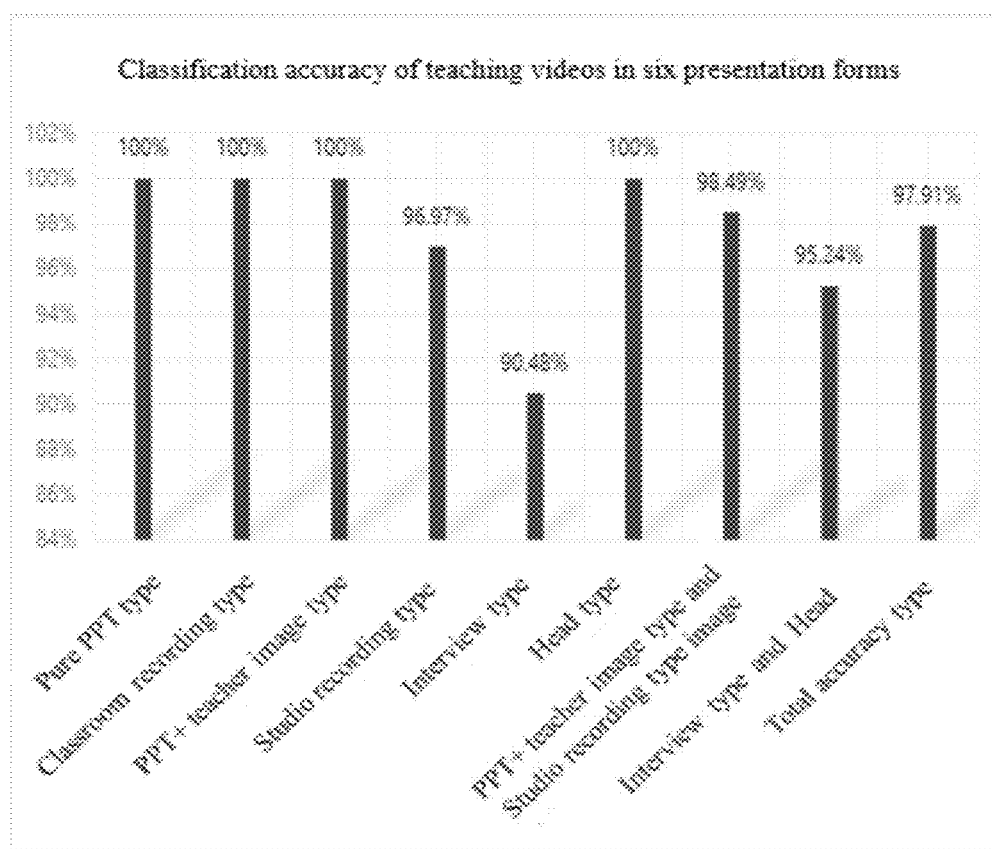
FIG. 3 shows the classification results of teaching videos provided by the example of the present disclosure.
Figure 4:
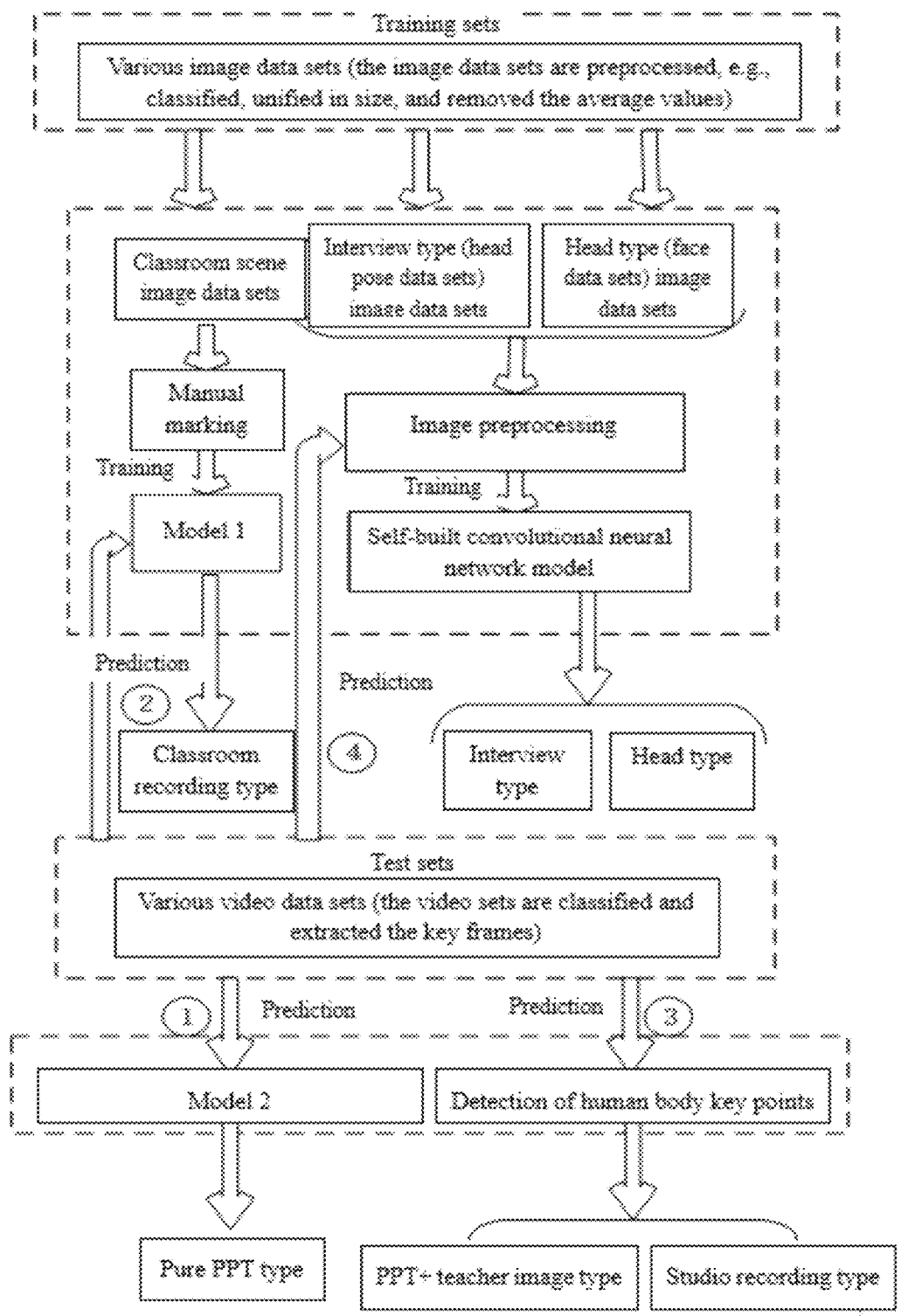
FIG. 4 shows a general flow chart of teaching video classification provided by the example of the present disclosure.

A self-built teaching video data set was used in the present disclosure to prove the effectiveness of the method. The teaching video data set included 189 teaching videos, which were 33 studio recording type teaching videos, 42 pure PPT type teaching videos, 40 PPT+ teacher image type teaching videos, 32 classroom recording type teaching videos, 21 Interview type teaching videos, and 21 Head type teaching videos, respectively. FIG. 2 shows examples of six teaching video presentation forms. FIG. 3 shows the classification results of teaching videos according to the example of the present disclosure. FIG. 4 shows a general implementation flow chart of the automatic classification technology of teaching videos based on different presentation forms provided by the example of the present disclosure. According to the flow chart, the steps of the present disclosure are introduced in detail as follows.

Step 1: Data sets, including an LSUN data set for scene recognition, a 300W-LP data set for head pose recognition, and a CACD2000 data set for face recognition, were collected, 1,000 images of classroom scenes were randomly selected from the LSUN data set, 12,500 images were randomly selected from the 300W-LP and CACD2000 data sets, and the images were divided into two types, namely the Interview type and the Head type. The data sets were processed as follows:

1. The above image data were grouped into three types of data sets: a classroom scene image data set, an Interview type image data set, and a Head type image data set. The Interview type image data set included 6162 images, and the Head type image data set included 6338 images.
2. All images in the above three types of data sets were unified in a size of 416×416.
3. Average values were removed from all images in the above three types of data sets.

Step 2: All images in the classroom scene image data set were manually marked in turn to form feature tags, i.e., blackboard, whiteboard, and screen.

Figure 5:
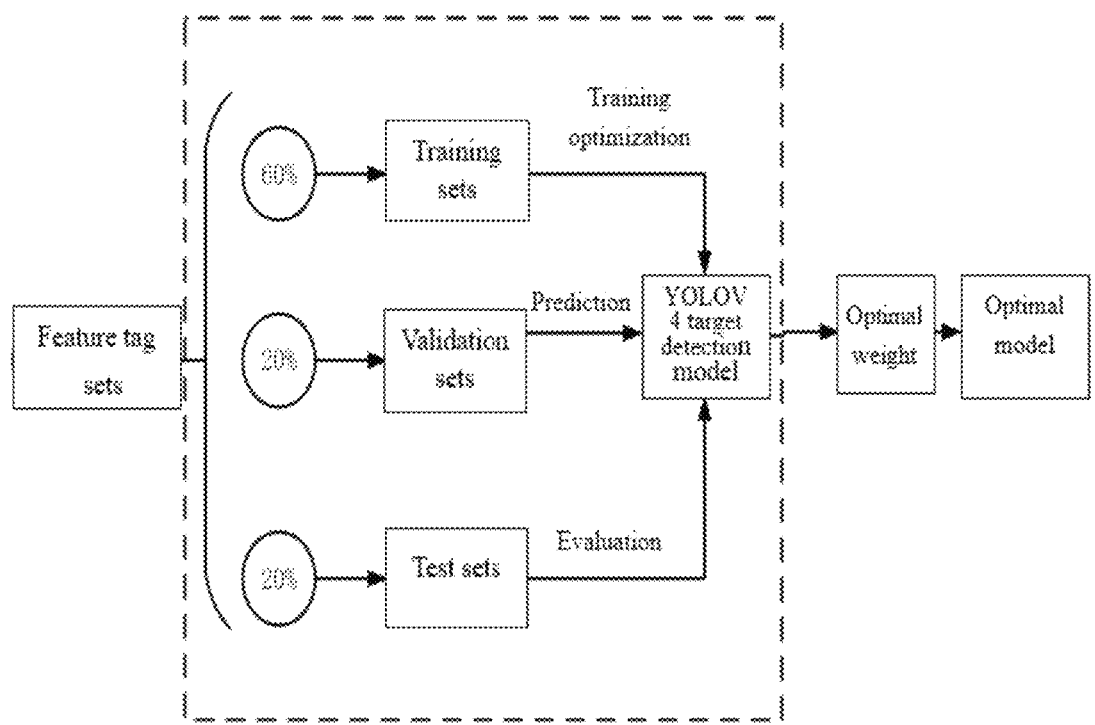
FIG. 5 shows the training flow chart of a YOLOV4 target detection model 1 provided by the example of the present disclosure.

Step 3: The feature tags were inputted into a YOLOV4 target detection neural network model for training, and the optimal YOLOV4 target detection neural network model 1 was obtained. The specific training process is shown in FIG. 5. The manually marked teacher feature tags were divided into a training set, a validation set and a test set according to a ratio of 6:2:2. Before training of the model, monitoring was set to prevent the model from over fitting. A data enhancement layer was added to improve the robustness and stability of the model. The model trained 48 Epochs with a Batch Size of 20. Through continuous training and optimization of the training sets and validation sets, the model was evaluated with the test sets, and finally the optimal weight was obtained and the optimal model was outputted.

Figure 6:
FIG. 6 shows preprocessing of two video training sets provided by the example of the present disclosure.

Step 4: Image pre-processing was conducted on the Interview type image data set and the Head type image data set: a part of a face image was cut out by face detection technology, and the images were unified in a size of 28×28, as shown in FIG. 6.

Figure 7:
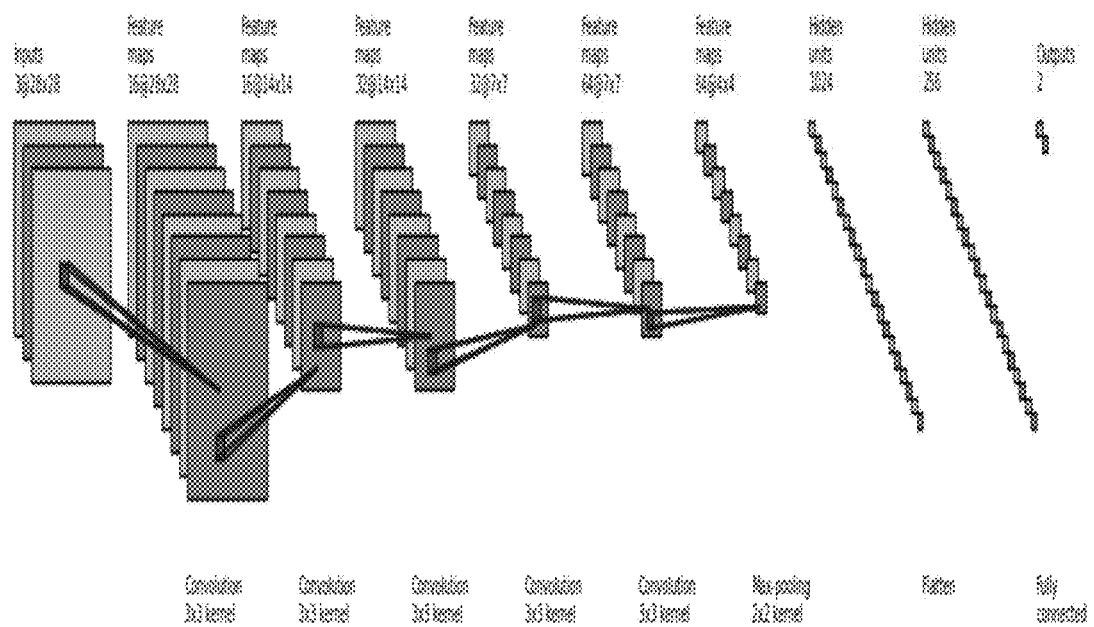
FIG. 7 shows the structure diagram of the self-built convolutional neural network model provided by the example of the present disclosure.

Step 5: A convolutional neural network model was built with the specific model structure shown in FIG. 7. A 28×28×3 image was inputted into the model, and passed through the first convolution layer with a size of 28×28×16, a convolution core size of 3×3, and a step size of 1. The result was outputted into the second convolution layer with a size of 14×14×16, a convolution core size of 3×3, and a step size of 2. The result was inputted into the third convolution layer with a size of 14×14×32, a convolution core size of 3×3, and a step size of 1. The process was proceeded as shown in FIG. 7, and finally the prediction result was outputted through the softmax function.

Figure 8:
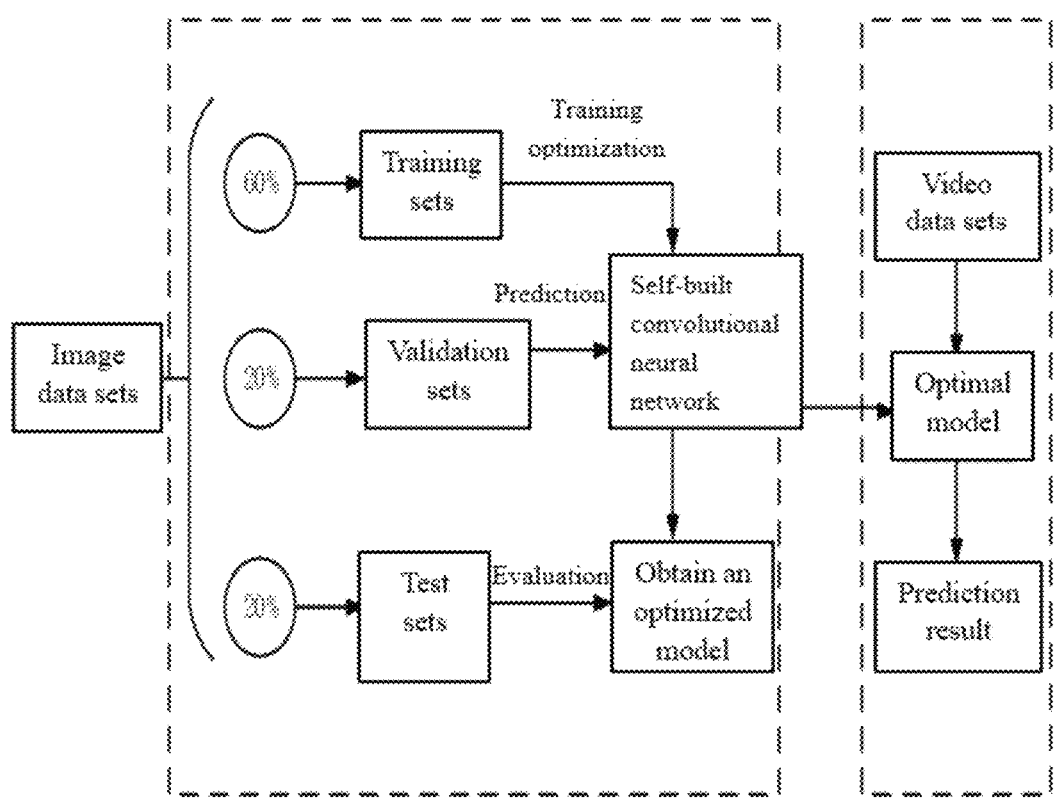
FIG. 8 shows the training flow chart of the self-built convolutional neural network model provided by the example of the present disclosure.
Figure 9:
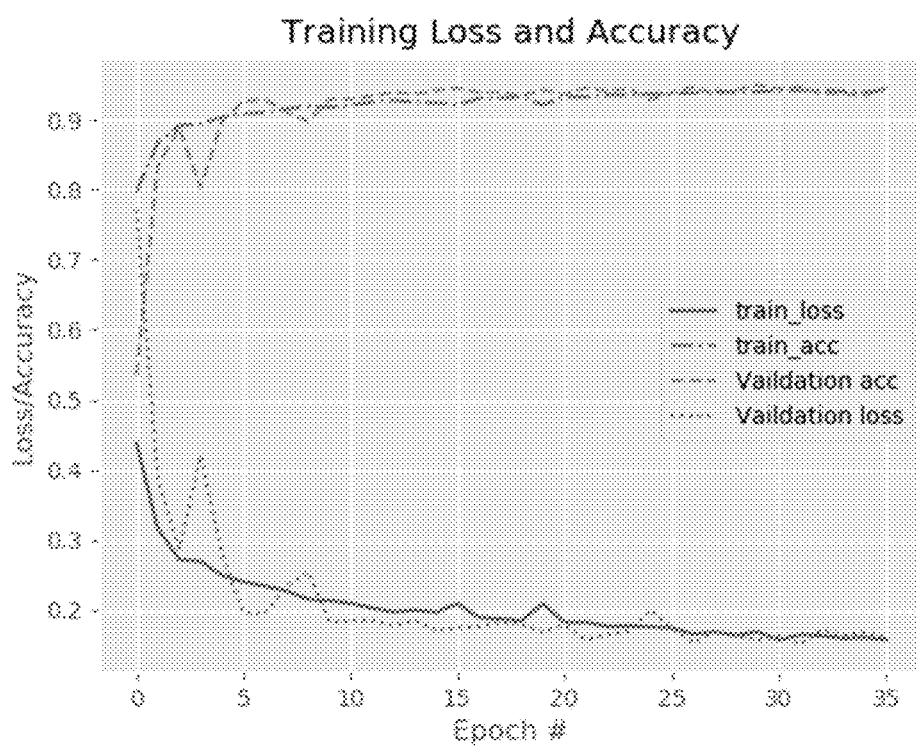
FIG. 9 shows an image prediction training flow chart of the self-built convolution model provided by the example of the present disclosure.

Step 6: A self-built convolutional neural network was trained. First, the preprocessed Interview type image data sets and Head type image data sets were divided into three parts, namely a training set, a validation set and a test set according to a ratio of 6:2:2. Before training of the model, monitoring was set to prevent the model from over fitting. A Prelu activation function was used, the learning rate was 0.001, and an Adaround optimizer was called to improve the generalization ability of the model. The model trained 48 Epochs with a Batch Size of 20. Through continuous training and optimization of the training sets and validation sets, the model was evaluated with the test sets, and finally the optimal weight was obtained and the optimal model was outputted. The training flow chart is shown in FIG. 8, and the loss rate and accuracy of the training process are shown in FIG. 9.

Figure 10:
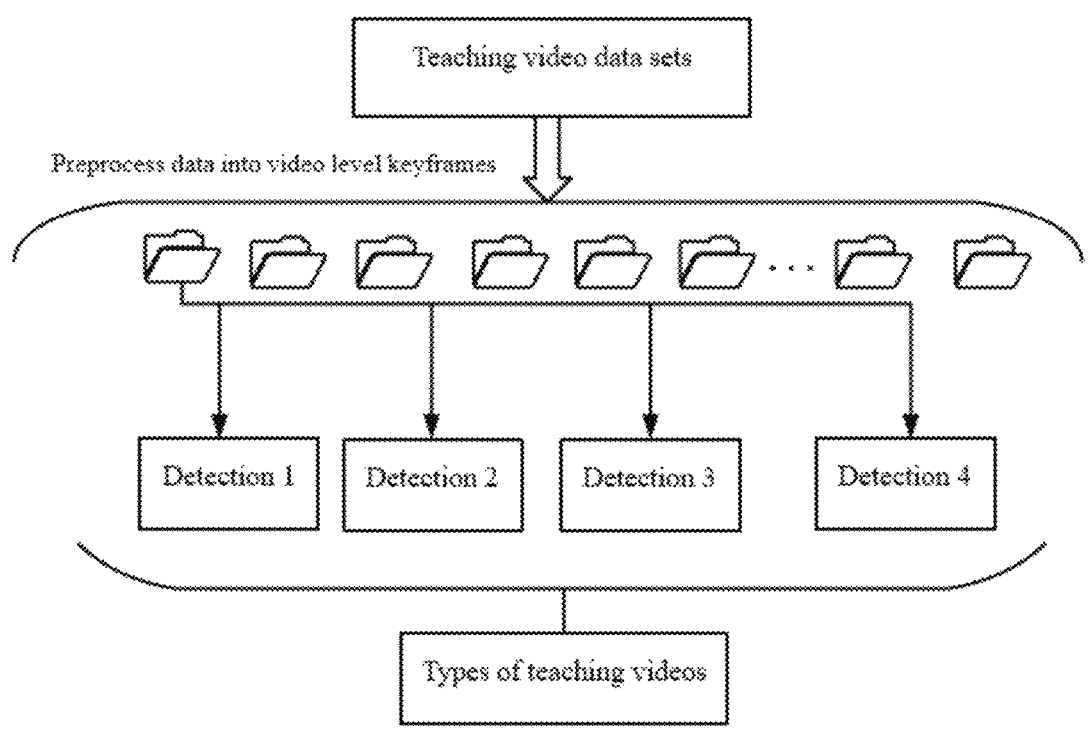
FIG. 10 shows a teaching video prediction flow chart provided by the example of the present disclosure.

Step 7: The general test flow of teaching videos is shown in FIG. 10. Based on the analysis of different presentation forms of teaching videos, teaching videos were divided into 6 types. Teaching videos in different presentation forms were collected from online learning platforms such as Mooc.com and Mooc platform of China University, and preprocessed as follows:

1. All teaching videos were classified according to 6 presentation forms.
2. Key frames were extracted from all teaching videos by means of interframe difference. The last one frame per second was extracted from the teaching videos, all the extracted frames were collected, two adjacent teaching video images $f_{k+1}(x, y)$ and $f_k(x, y)$ were standardized and subtracted, where $f_k(x, y)$ represented the pixel point (x, y) of the kth frame, the absolute value of the difference between the pixel values at the corresponding positions of two images was obtained, and whether the absolute value was greater than a threshold (T) was determined, as shown in Formula (1). Finally, a video level key frame data set was formed by selecting the images with the largest differences as the video key frames.

$$|f_{k+1}(x,y) - f_k(x,y)| > T \qquad (1)$$

Figure 11:
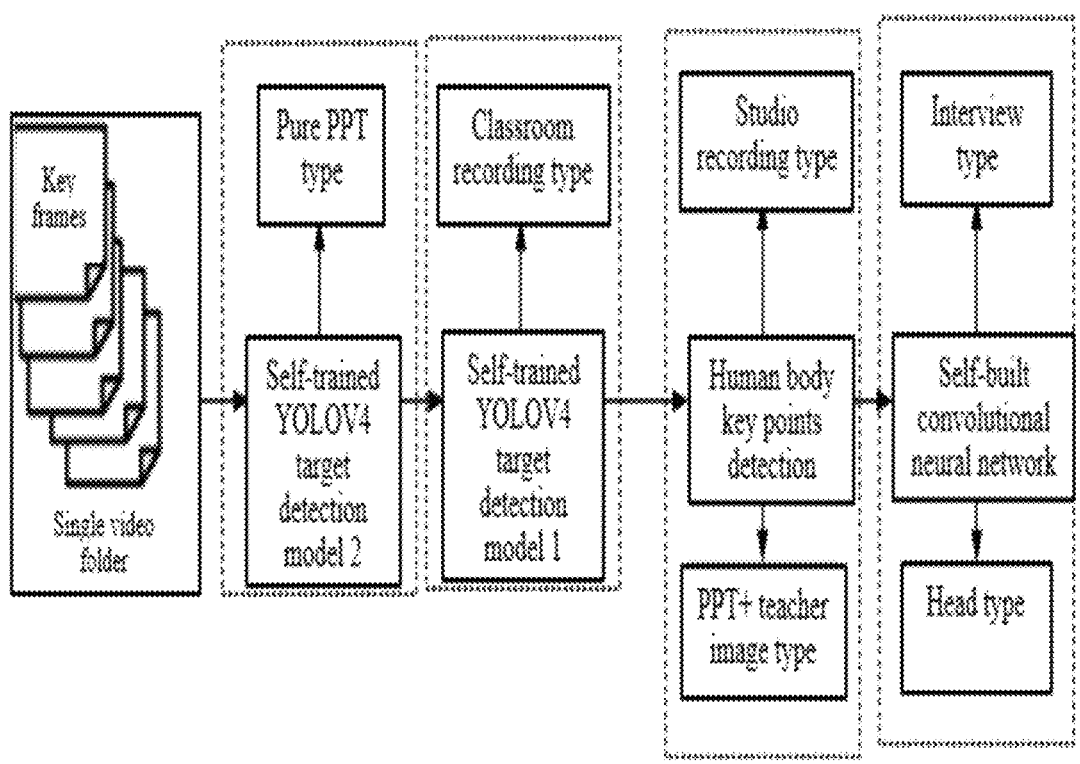
FIG. 11 shows a single teaching video classification flow chart provided by the example of the present disclosure.

Step 8: A specific determination flow of teaching videos is shown in FIG. 11. The video level data sets (all key frames in a single folder represented all features of a teaching video) were inputted into the YOLOV4 target detection neural network model 2 trained with the COCO data set. Whether a teaching video was a pure PPT type was determined according to the character information detected by the model, that is, whether the ratio (SI/N) of the character information SI detected in a teaching video to the total number of key frames N of the teaching video was less than 10%. If the above condition was true, the teaching video was a pure PPT type. Otherwise, the teaching video entered the self-trained YOLOV4 target detection neural network model 1 to continue to determine whether the ratio (CI/N) of classroom information (CI) outputted by the model 1 to the total number of key frames N of the teaching video was greater than 80%. If the above condition was true, the teaching video was the classroom recording type. Otherwise, human body key points were used for detection:

1. The value Hy of the height of the highest point of a character in the displayed key frame, the value by of the height of the lowest point of the character, and the height H of a key frame image were outputted, M was calculated according to $M = \|Hy - By\|/H$, and the value of M was determined. If M<0.4, the teaching video was the PPT+ teacher image type.
2. If the hip or the part below the hip could be detected, the teaching video was the studio recording type.

Finally, the remaining data was detected using the self-built convolutional neural network model and the classification result was outputted.

Figure 12:
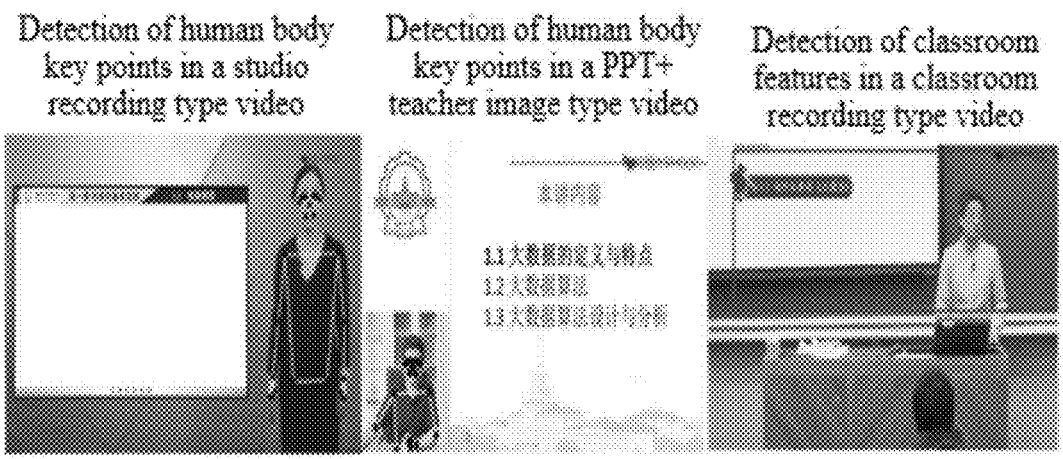
FIG. 12 shows an illustration processed after image detection provided by the example of the present disclosure.

By the above steps, all the teaching videos were classified based on different presentation forms, and the test accuracy of the video data sets was 97.91%, where the accuracy rates of the pure PPT type, the classroom recording type, the PPT+ teacher image type and the Head type were 100%, the accuracy rate of the Interview type was 90.48%, and the accuracy rate of the studio recording type was 96.97%. The effectiveness of the method was proved by the above classification results of teaching videos. Finally, detection of key frames of a teaching video by human body key point detection and the self-trained YOLOV4 target detection neural network model is shown in FIG. 12.

The automatic classification technology of teaching videos based on different presentation forms provided by the present disclosure combines the target detection technology and video classification technology, classifies teaching videos based on different presentation forms by a self-trained target detection neural network and a self-built convolutional neural network, and is an innovative method. The method can not only provide new classification methods and ideas for analysts in the related field of video classification, but also be applied to other fields. e.g., in psychology, to explore the impact of different presentation forms of information on learners' cognitive load, etc., and in pedagogy, to explore the impact of different presentation forms of teaching videos on learners' acceptance, satisfaction, etc., or to analyze the quality and recommendation of teaching videos in different presentation forms. Finally, the results of teaching video presentation may also help learners quickly find appropriate teaching videos, and also help video producers to make targeted videos.

The present disclosure further provides an automatic classification system of teaching videos based on different presentation forms, which is implemented by deep learning technology, and includes the following three neural network model units:

a self-trained YOLOV4 target detection network model 1 unit: a large number of collected images with classroom features are used as data sets, classroom features on each image are marked, and a YOLOV4 target detection network model is trained and optimized using the marked tags, so that the YOLOV4 target detection network model 1 may detect classroom features in images or videos:

a self-trained YOLOV4 target detection network model 2 unit: a YOLOV4 target detection network model is trained using a public COCO data set, so that the YOLOV4 target detection network model 2 may output character information in images or videos; and a self-built convolutional neural network model unit: Prelu is used as an activation function, an Adabound optimizer is used, a data enhancement layer is added to the first layer, each layer uses Batch Normalization for batch normalization, and the last layer uses a softmax function for classifying key frames of teaching videos.

It should be noted that the embodiment of the present disclosure may be implemented by hardware, software or combination of software and hardware. A hardware part may be realized by special logic. A software part may be stored in a memory and executed by an appropriate instruction execution system, e.g., a microprocessor or specially designed hardware. Those skilled in the art may understand that the above devices and methods may be implemented using computer executable instructions and/or included in processor control codes, for example, such codes are provided on a carrier medium such as a disk, CD or DVD-ROM, a programmable memory such as a read-only memory (firmware), or a data carrier such as an optical or electronic signal carrier. The device and modules thereof of the present disclosure may be implemented by hardware circuits such as VLSI or gate arrays, semiconductors such as logic chips and transistors, or programmable hardware devices such as field programmable gate arrays and programmable logic devices, or by software executed by various types of processors, or by the combination of the above hardware circuits and software, such as firmware.

What is claimed is:

1. An automatic classification method of teaching videos based on different presentation forms, comprising:
    extracting classroom features from key frames of a video using a self-trained YOLOV4 target detection network model 1, and determining whether the video is a classroom recording type by the outputted classroom features;
    determining whether the video is a pure PPT type by the information outputted from a self-trained YOLOV4 target detection network model 2;
    distinguishing PPT plus teacher image type videos from studio recording type videos according to human body key point detection; and
    distinguishing features of interview type videos from features of head type videos using a self-built convolutional neural network model.

2. The automatic classification method of teaching videos based on different presentation forms according to claim 1, specifically comprising:
    (1) collecting six types of teaching videos, classifying the collected video sets according to six types of teaching videos, and extracting video key frames;
    (2) after extracting the video key frames, preprocessing the video key frames to form video folders, each folder being composed of corresponding video key frames as a test set for teaching video detection;
    (3) detecting the preprocessed key frames in the folders of videos by two self-trained YOLOV4 target detection network models, and determining whether the video types are pure PPT type, PPT plus teacher image type, classroom recording type and studio recording type through the outputted information;
    (4) cutting the face parts of key frames in the interview type and head type videos in a size of 28×28 through face detection technology;
    (5) since the interview type and the head type teaching videos have some differences in head pose features, collecting and classifying public data sets of face images and head poses; and
    (6) inputting the key frames in the remaining folder into the self-built convolutional neural network model for classification detection.

3. The automatic classification method of teaching videos based on different presentation forms according to claim 2, wherein the six types of teaching videos in step (1) comprise pure PPT type, PPT plus teacher image type, classroom recording type, studio recording type, interview type and head type.

4. The automatic classification method of teaching videos based on different presentation forms according to claim 2, wherein the preprocessing the video key frames in step (2) comprises unifying the picture size to 416×416 and removing average values from the images.

5. The automatic classification method of teaching videos based on different presentation forms according to claim 2, wherein in step (5), the collected public data sets are used as training sets, validation sets and test sets for training and distinguishing the two video types, three types of data are input into the self-built convolutional neural network respectively, and after the optimal weight is obtained, the video folders formed by the key frames extracted from the two types of videos are used as the final test sets for final detection.

6. An automatic classification system of teaching videos based on different presentation forms for the automatic classification method of teaching videos based on different presentation forms according to claim 1, comprising:
    a self-trained YOLOV4 target detection network model 1 unit: a large number of collected images with classroom features are used as data sets, classroom features on each image are marked, and a YOLOV4 target detection network model is trained and optimized using the marked tags, so that the YOLOV4 target detection network model 1 detects classroom features in images or videos;
    a self-trained YOLOV4 target detection network model 2 unit: a YOLOV4 target detection network model is trained using a public COCO data set, so that the YOLOV4 target detection network model 2 outputs character information in images or videos; and
    a self-built convolutional neural network model unit: Prelu is used as an activation function, an Adabound optimizer is used, a data enhancement layer is added to the first layer, each layer uses Batch Normalization for batch normalization, and the last layer uses a softmax function for classifying key frames of teaching videos.

7. The automatic classification system of teaching videos based on different presentation forms according to claim 6, wherein the self-built convolutional neural network model unit comprises 5 convolution layers, 1 pooling layer, 1 Dropout layer and 2 fully connected layers connected in turn,
- 3 convolution layers having a convolution core size of 3×3 and a step size of 1, 2 convolution layers having a convolution core size of 3×3 and a step size of 2, and the convolution layers with the step size of 1 and the convolution layers with the step size of 2 being arranged alternately; and
- the pooling layer having a size of 2×2 and a step size of 2, and being connected behind the last convolution layer: the first fully connected layer having a size of 256; the parameter of the Dropout layer being 0.3; the size of the second fully connected layer being the size of the classified video type; and the size of an input layer being 28×28×3.

8. A computer program product stored on a non-transitory computer-readable medium, comprising a computer-readable program, when executed on an electronic device, providing a user input interface to apply the automatic classification method of teaching videos based on different presentation forms according to claim 1.

9. A non-transitory computer-readable storage medium for storing instructions, wherein when the instructions are run on a computer, the computer applies the automatic classification method of teaching videos based on different presentation forms according to claim 1.

10. An information data processing terminal, configured to implement the automatic classification method of teaching videos based on different presentation forms according to claim 1.

* * * * *